(12) United States Patent
Reeves et al.

(10) Patent No.: US 7,523,178 B2
(45) Date of Patent: Apr. 21, 2009

(54) TOLERATING FAILURE OF TRAFFIC MANAGEMENT SYSTEMS

(75) Inventors: Damian John Reeves, Cambridge (GB); Ben Ross Mansell, Cambridge (GB); Owen John Garrett, Ely (GB); Crispin Edward Harold Flowerday, Cambridge (GB)

(73) Assignee: Zeus Technology Limited, Cambridge (GB)

( * ) Notice: Subject to any disclaimer, the term of this patent is extended or adjusted under 35 U.S.C. 154(b) by 423 days.

(21) Appl. No.: 11/124,835

(22) Filed: May 9, 2005

(65) Prior Publication Data

US 2005/0262238 A1    Nov. 24, 2005

(30) Foreign Application Priority Data

May 7, 2004    (GB)    ................................ 0410151.5

(51) Int. Cl.
*G06F 15/173*    (2006.01)
*H04L 1/22*    (2006.01)

(52) U.S. Cl. ........................ 709/221; 709/223; 709/224; 709/226; 370/216

(58) Field of Classification Search ................. 709/221, 709/223–224, 226
See application file for complete search history.

(56) References Cited

U.S. PATENT DOCUMENTS 5,661,719 A * 8/1997 Townsend et al. ........... 370/216
2002/0032760 A1 * 3/2002 Matthews et al. ............ 709/223
2002/0120763 A1 * 8/2002 Miloushev et al. .......... 709/230
2006/0059238 A1 * 3/2006 Slater et al. ................. 709/206

OTHER PUBLICATIONS

Collins et al: Achieving Scalable Cluster System Analysis and Management with a Gossip-based Network Service. 2001. IEEE Computer Soc., pp. 49-58. ISBN 0-7695-1321-2.
Tripathi et al: Secure Multi-Agent Coordination in a Network Monitoring System. 2003, Software engineering for large-scale multi-agent systems. pp. 251-266. ISBN 3-540-08772-9.

* cited by examiner

*Primary Examiner*—Jeffrey Pwu
*Assistant Examiner*—Sulaiman Nooristany
(74) *Attorney, Agent, or Firm*—Harness, Dickey & Pierce, P.L.C.

(57) ABSTRACT

Failures are tolerated in an environment in which a plurality of traffic management systems are coordinated to manage the supply of data to and from a plurality of clients via a plurality of network addresses. Each functional traffic management system is responsible for at least one network address, and each functional traffic management system periodically transmits a signal to each of the other traffic management systems to confirm functionality. Each of the traffic management systems creates and maintains configuration data that specifies the responsibility of traffic management systems for network addresses dependent upon the status of each of the traffic management systems. Each of the traffic management systems responds to a failure of any of the traffic management systems by taking responsibility for certain network addresses as prescribed by the configuration data.

22 Claims, 15 Drawing Sheets

| WORKING | IP ADDRESS ASSIGNMENTS | | |
|---|---|---|---|
| | a | b | c |
| 701  a b c | 1 | 2 | 3 |
| 702  a b | 1 , 3 | 2 | — |
| 703  a c | 1 | — | 2 , 3 |
| 704  b c | — | 1 , 2 | 3 |
| 705  a | 1 , 2 , 3 | — | — |
| 706  b | — | 1 , 2 , 3 | — |
| 707  c | — | — | 1 , 2 , 3 |

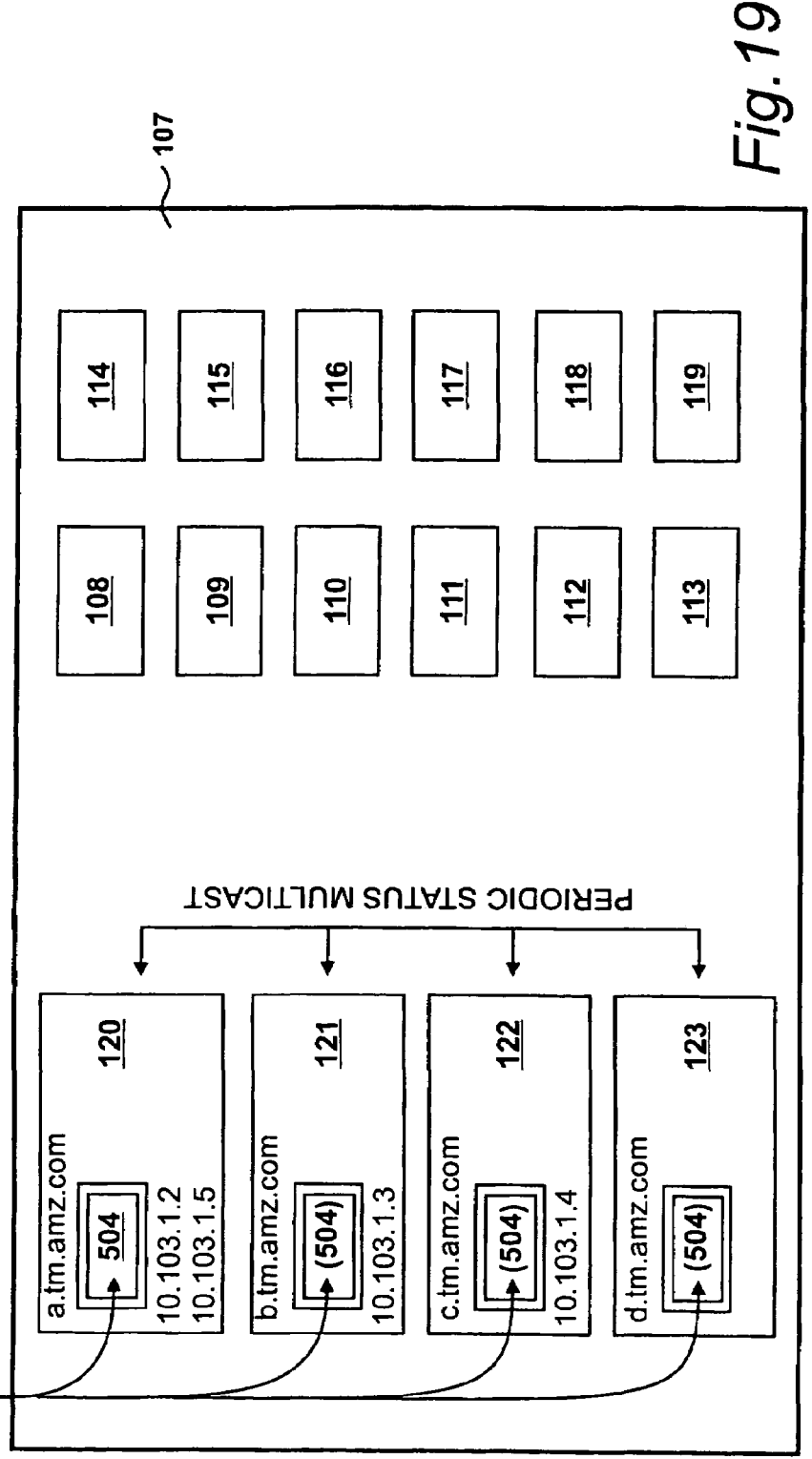

TOLERATING FAILURE OF TRAFFIC MANAGEMENT SYSTEMS

FIELD OF THE INVENTION

The present invention relates to tolerating a failure in an environment in which a plurality of traffic management systems are co-ordinated to manage the supply of data to and from a plurality of clients via a plurality of network addresses.

BACKGROUND OF THE INVENTION

Many situations arise in which a very large number of clients, possibly browsing the Internet, require access to a particular data source, such as a highly popular website. In order to serve data to many clients of this type, it known to make the data available from many servers acting as a collection with traffic management systems being used to even out loading in an attempt to optimise the available functionality.

In an environment of this type, problems may occur if traffic managers (also referred to as load balancers) become inoperative. A number of solutions have been proposed such as the inclusion of an inoperative slave associated with each operational traffic manager such that the slave takes over when its associated master traffic manager ceases to operate correctly. It will be appreciated that this is a relatively costly solution and it is always possible for the slave to fail resulting in a loss of service.

An alternative solution is to provide a set of traffic managers that include active and standby subsets. Addresses are shared among the active traffic managers and standby traffic managers take over IP addresses when a machine fails. Yet another alternative approach is to provide a set of traffic managers in which the addresses are shared out evenly so as to spread the processing requirement. When a machine fails, one or several of the remaining working machines takes over the IP addresses of the failed machine, with the intention that the increased workload for the fewer number of active traffic managers is spread as evenly as possible, or in an appropriate way if the machines have different capabilities. However, the decision as to which traffic manager should take over requires an election between the systems and can lead to faulty load balancing.

BRIEF SUMMARY OF THE INVENTION

According to an aspect of the present invention, there is provided a method of tolerating a failure in an environment in which a plurality of traffic management systems are coordinated to manage the supply of data to and from a plurality of clients via a plurality of network addresses, wherein each functional traffic management system is responsible for at least one network address, each functional traffic management system periodically transmits a signal to each of the other traffic management systems to confirm functionality, each of said traffic management systems creates and maintains configuration data that specifies the responsibility of traffic management systems for network addresses dependent upon the status of each of the traffic management systems, and each of said traffic management systems responds to a failure of any of said traffic management systems by taking responsibility for certain network addresses as prescribed by said configuration data.

BRIEF DESCRIPTION OF THE SEVERAL VIEWS OF THE DRAWINGS

FIG. 19 illustrates a transition table in use.

WRITTEN DESCRIPTION OF THE BEST MODE FOR CARRYING OUT THE INVENTION

FIG. 1

Figure 1:
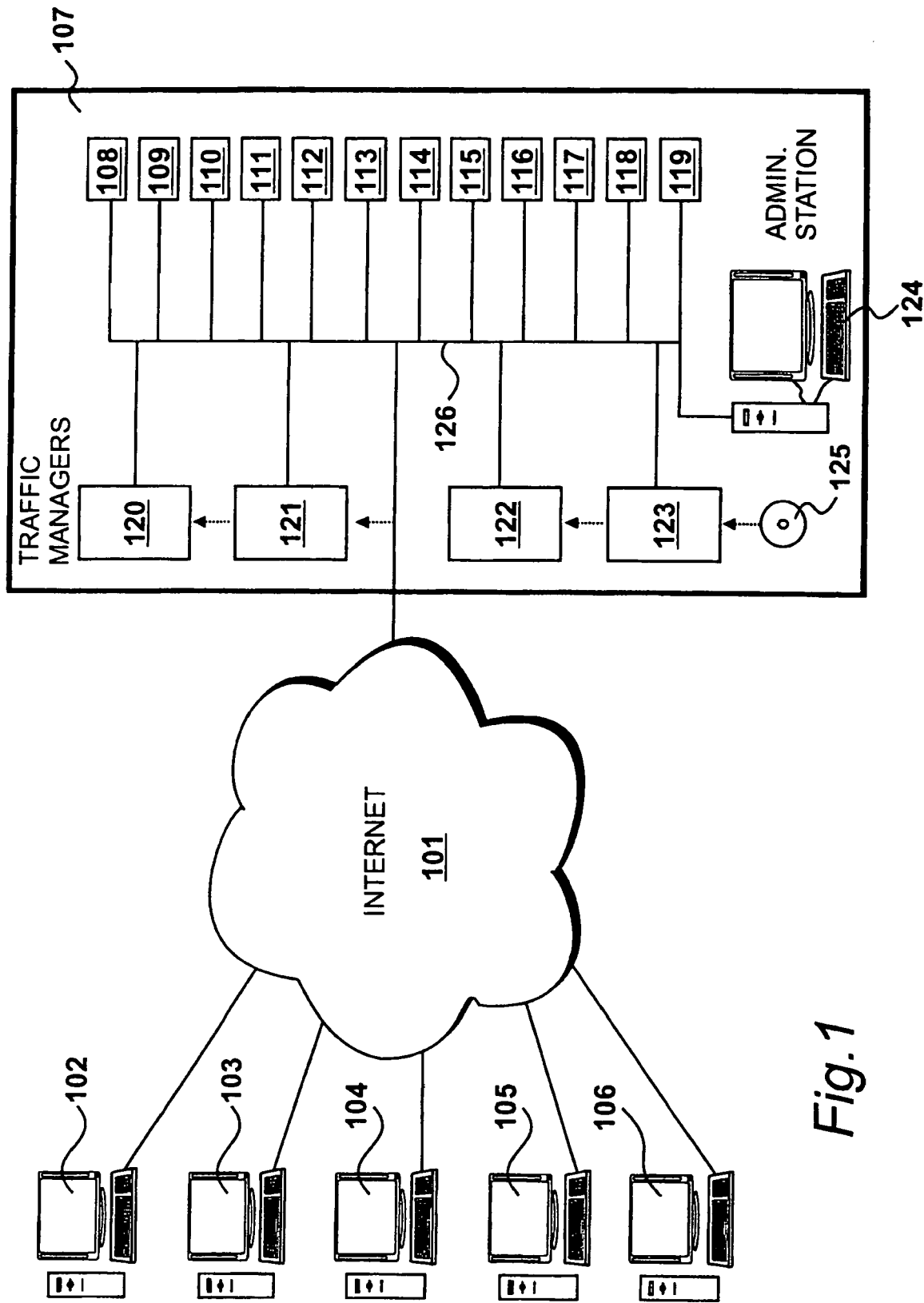
FIG. 1 shows an embodiment of the invention for accessing data over the Internet.

The following embodiment is described with respect to accessing data over the Internet, although it should be appreciated that the techniques involved have applications in other networked environments.

The Internet is illustrated at 101 and receives requests from many browsing clients, a small section of which are illustrated as browsing clients 102 to 106.

A service provider 107 includes servers 108 to 119, traffic managers 120 to 123, an administration station 124, traffic manager instructions encoded onto a CD-ROM 125 or similar data carrying medium, and an internal network 126.

In this example, the service provider 107 has a single URL and is therefore configured to provide information from a popular website to a significantly large number of browsing clients.

A domain name server (DNS) on the Internet associates this URL with several IP addresses, which are assigned to the traffic managers 120 to 123. Each traffic manager has a different IP address or several IP addresses assigned to it. When a browsing client attempts to access the site via the relevant URL, a domain name server serves the several associated IP addresses to the client, such as client 102. The client then picks one of these IP addresses, usually at random. In this way, large numbers of clients 102 to 106 (typically hundreds or thousands) choose traffic manager 120 to 123 at random, resulting in a spread of the traffic load. This approach to spreading traffic load is known as round-robin DNS. Each traffic manager is thus considered to be responsible for a number of IP or network addresses.

The traffic manager 120 receives a client request (an HTTP request) and analyses it, in part or completely, in order to decide which server 108 to 119 to convey the request to. It may decide this according to several criteria. For example, it may wish to simply spread the load, in which case it will choose the least loaded server. Traffic management, however, usually involves selecting servers on the basis of their functionality. In such a scenario, servers are grouped into pools. A first pool may serve static web pages, a second pool may serve dynamic content and a third pool may serve secured data over an HTTPS connection. The traffic manager 120 chooses which to access, based upon the type of request. Thus, this additional functionality may be considered as identifying the difference between traffic management compared to basic load balancing.

The administration station 124 is used to remotely configure the traffic managers and the servers, such that it is not necessary to provide the traffic managers and servers with an output monitor or a keyboard input etc. Consequently, these systems have a hardware implementation that consists of a one- or two-unit rack mounted device connected to a network. The administration station is also used for installing instructions, including server instructions and traffic managing instructions.

The CD-ROM 125 containing traffic managing instructions may be loaded directly onto the traffic managers 120 to 123 if they have CD-ROM drives, or instructions from the CD-ROM can be installed from the CD-ROM drive of the administration station 124 via the network 126 onto the traffic managers 120 to 123.

In the present embodiment, service requests are managed in a system having many servers for serving clients in response to at least one address, under the supervision of a set of traffic management systems. Each incoming address is assigned to a traffic manager and each of the traffic management systems is configured such that firstly it intermittently transmits its availability to the other traffic management systems in the set. Secondly, it identifies a change in the availability of the other traffic managers in the set. Thirdly, it modifies its address assignment in response to the identified change of availability. In this way, it is possible to balance incoming service request management against the availability of the traffic management systems. Each traffic manager 120 to 123 is provided with local information telling it which of the available servers should be accessed in response to receiving each specific IP address. Each traffic management system, in this embodiment, issues a multicast on a periodic basis informing the other traffic management systems to the effect that the traffic management system is available, although this transmitting of a signal to confirm functionality could take other forms than multicasting. Failure to receive a multicast in this way identifies to the other servers that availability has been lost. Each is then provided with information allowing a reconfiguration such that each is made aware of the IP addresses that it is now additionally responsible for.

Figure 2:
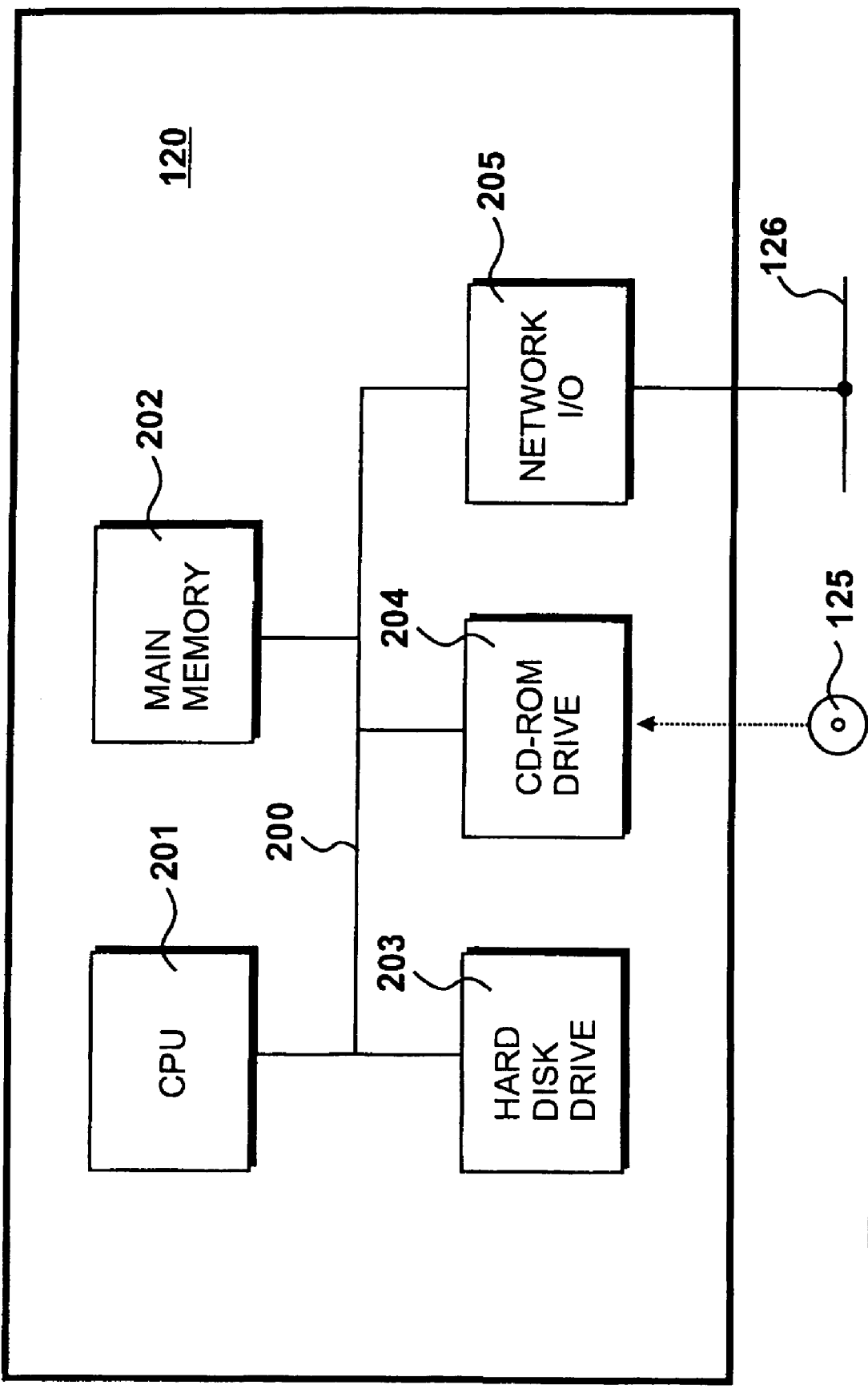
FIG. 2 shows details of the hardware configuration for a specific traffic manager.

Details of the hardware configuration for a specific traffic manager 120 is illustrated in FIG. 2.

FIG. 2

All traffic managers 120 to 123 are substantially the same, and the servers 108 to 119 are similarly configured.

Internally, components of the traffic manager communicate over a system bus 200. The central processing unit 201 may be a Pentium 6 running at 5.2 gigahertz and includes on-chip primary and secondary cache, to facilitate access to frequently used instructions and data.

A main memory 202 provides, for example, 2 gigabytes of dynamic RAM, in which instructions and data are stored for regular access while the system is operating. A hard disk drive 203 provides typically 60 gigabytes of non-volatile storage of instructions and configuration data. The disk 203 also provides storage for infrequently accessed data, such as configuration files, that are loaded into main memory when the system is initialised.

In this example, a CD-ROM drive 204 is shown which, as previously stated, is configured to receive the data carrying medium, such as a CD-ROM, so as to facilitate the loading of instructions for implementing the traffic management functionality. Communication to network 126 is provided via a network interface card 205.

Figure 3:
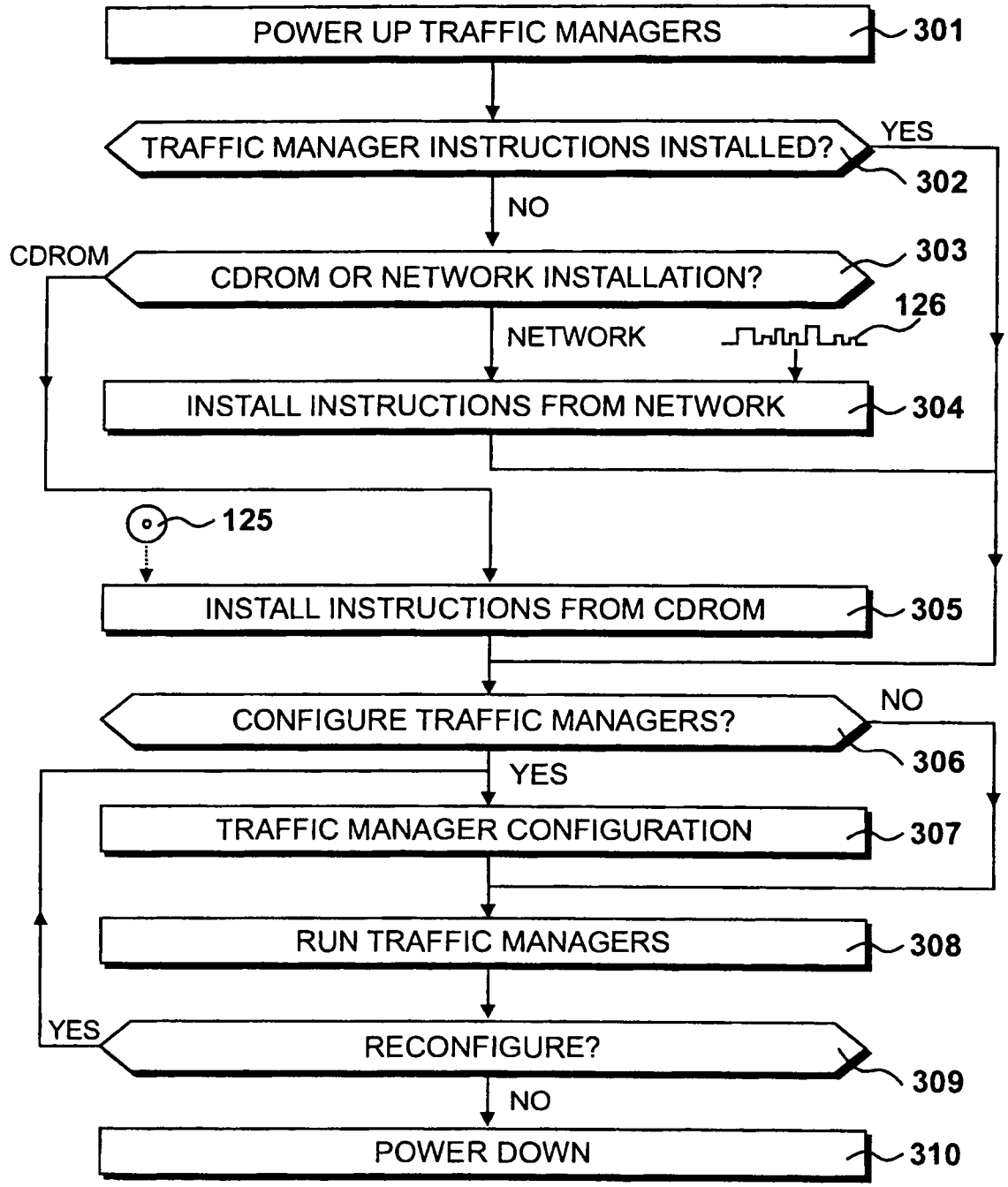
FIG. 3 shows procedures for implementing operation of the system.

Procedures for implementing operation of the system are illustrated in FIG. 3.

FIG. 3

The procedures illustrated in FIG. 3 are performed primarily via the administration station 124 and are relevant to the configuration of the traffic managers.

At step 301 power is supplied to the traffic managers and at step 302 a question is asked as to whether the instructions for traffic management have been installed. If not installed, a further question is asked at step 303 as to whether CD-ROM or network installation is to take place, resulting in the installation of instructions via the network at step 304 or installation of instructions from CD-ROM or a similar data-carrying medium at step 305.

At step 306 a question is asked as to whether the traffic managers are to be configured, and when answered in the affirmative the configuration procedure takes place at step 307.

The traffic manager procedures are implemented at step 308 whereafter, at step 309, the question is asked as to whether a reconfiguration is to take place. When answered in the affirmative, control is returned to step 307 and traffic manager reconfiguration is implemented. Alternatively, if no further operations are required a power-down procedure may be implemented at step 310.

Figure 4:
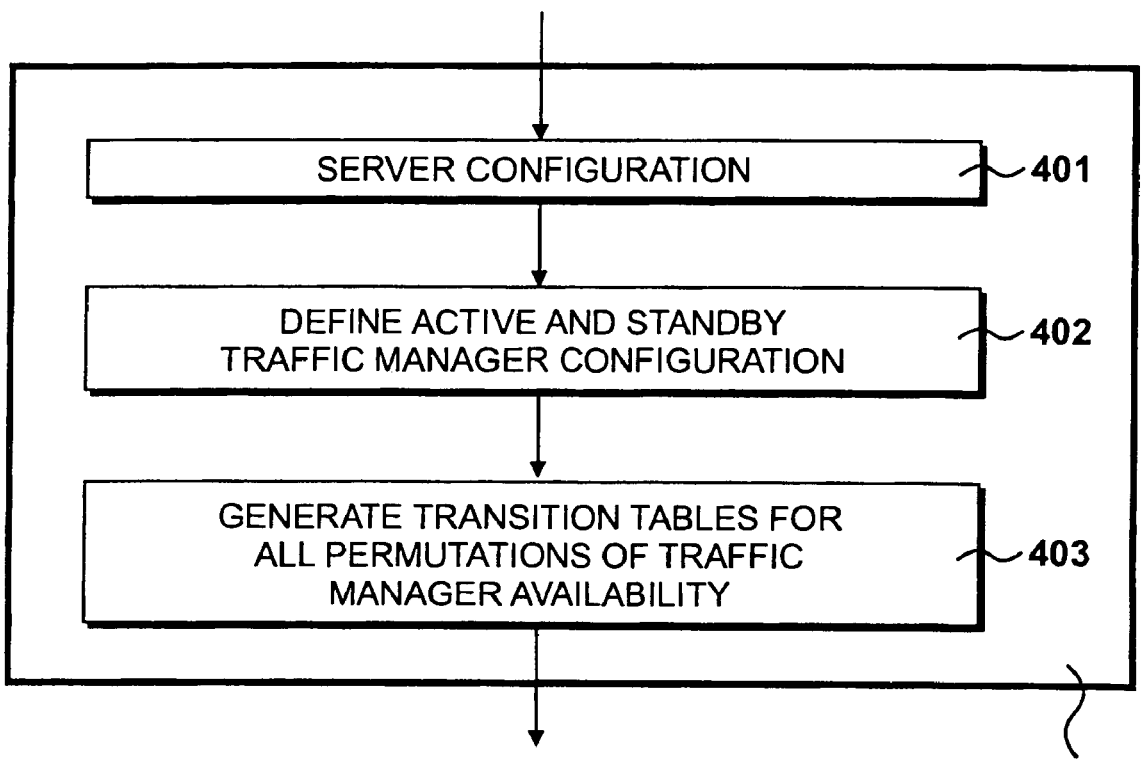
FIG. 4 shows traffic manager configuration procedures.

Traffic manager configuration procedures, identified at step 307, are detailed in FIG. 4.

FIG. 4

At step 401 server configuration takes place. This involves defining server pools and other standard configuration information.

At step 402 a definition is made as to which traffic managers are available. In addition, names allocated to the traffic managers are also identified so that they can be referred to in the transition table that is created. Names for the traffic managers in this embodiment typically take the form of a.tm.amz.com.

Procedure 402 also involves obtaining a list of the IP addresses that are to be shared among the traffic managers. Furthermore, it is also necessary to define which machines are initially active or on standby. For the purposes of an illustrative example, traffic managers 120 to 122 are considered to be active and traffic manager 123 is considered to be on standby.

This data is supplied via the administration station 124 and then conveyed to the traffic managers over the network 126.

At step 403 configuration data is generated that specifies the responsibility of traffic management systems for network addresses dependent upon the status of each of the systems. In this embodiment, the data takes the form of a transition table for all permutations of traffic manager availability. The transition table defines how IP addresses will be reassigned when one (or possibly several) of the traffic managers fail.

The administration station conveys data to the traffic managers such that they are placed in a condition where they are able to configure themselves using the data that has been provided. Each traffic manager creates its own copy of the transition table by running a copy of the same algorithm. However, in an alternative embodiment it would be possible for the transition table to be generated once, possibly at the administration station 124, and then distributed to the traffic managers. In either case, the transition tables at each of the traffic manager systems are substantially the same, thereby enabling traffic managers to self-configure without the need to communicate with other traffic managers when reaching a decision about new IP address configuration required as a result of a change in availability of traffic managers.

Figure 5:
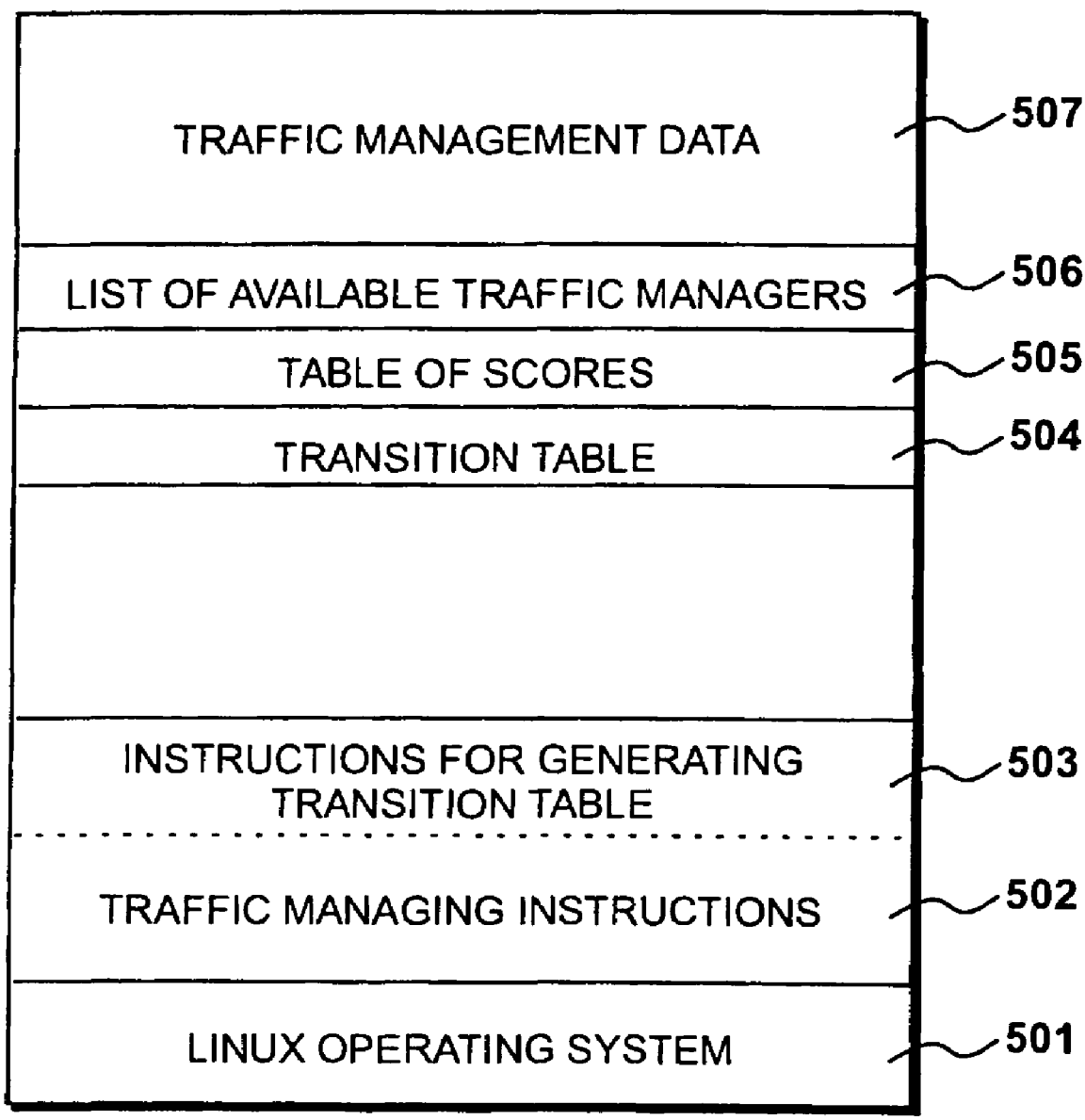
FIG. 5 shows a mapping of instructions and data held within the main memory shown in FIG. 2.

A mapping of instructions and data held within main memory 202, when operational, is illustrated in FIG. 5.

FIG. 5

As part of the loading process an operating system, such as Linux® or an alternative, is loaded at 501.

The traffic managing instructions themselves are loaded at 502, including instructions for generating a transition table which are illustrated at 503.

The transition table itself is illustrated as being located at 504 and a table of scores used during the creation of the transition table is held at location 505. A list of available traffic managers is held at location 506 and location 507 provides space for the storage of traffic management data.

Figures 6, 7:
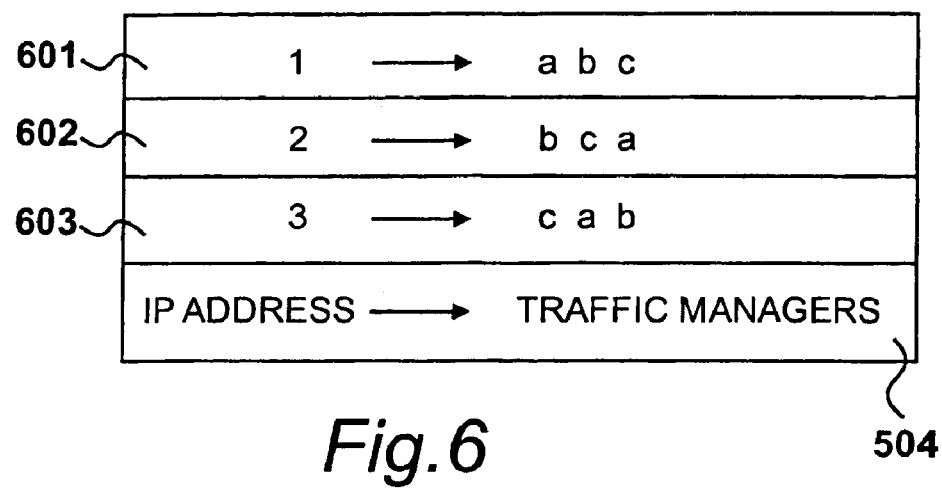
FIG. 6 shows an example of a transition table of the type held in the memory shown in FIG. 7.
FIG. 7 illustrates the complete set of permutations for system availability for the transition table shown in FIG. 8.

An example of a transition table of the type held at location 503 is illustrated at FIG. 6.

FIG. 6

For the purposes of providing an illustrative example, the transition table shown in FIG. 6 is appropriate for three traffic management systems and three IP addresses. In this example, the IP addresses are shown as numbers 1, 2 and 5 and the traffic management systems are named as letters, specifically a, b and c. The IP addresses will actually take the form 12.103.1.2 and so on, and the names of the traffic management systems will be of the form previously described.

Considering the first row 601, IP address 1 is assigned to traffic management system a. However, if a is not available, IP address 1 gets assigned to traffic management system b. Similarly, if b is not available, IP address 1 is assigned to traffic management system c.

Row 602 concerns the assignment for IP address 2. Thus, IP address 2 is assigned to traffic management system b if system b is available. Alternatively, if system b is not available, IP address 2 is assigned to traffic management system c. Furthermore, if system c is not available, IP address is assigned to machine a.

The third row operates in a similar fashion. Thus, IP address 5 is normally assigned to traffic management system c if system c is available. However, if system c is not available, IP address will be assigned to system a. Finally, if system a is not available, IP address 5 will be assigned to system b.

Thus, the transition covers all possible combinations of traffic management system failure and ensures that an IP address is assigned accordingly to one of the remaining machines. The complete set of permutations for system availability is illustrated in FIG. 7.

FIG. 7

A property of the transition tables is that when a machine fails, the only IP address movements that occur are those from the failed machine to the other machines in the cluster. Similarly, when a machine becomes available again, the only movements are onto the new machine. This avoids unnecessary IP address movements, thus reducing the chance of random connections being dropped. A traffic management system is considered to be non-functional or not operational if it stops multicasting on the network, for whatever reason. Possible reasons could be a software crash, a power outage, a hardware failure, and so on.

FIG. 7 illustrates the consequences of implementing the table of FIG. 6 with respect to all possible availability states.

Line 701 illustrates the operating condition in which traffic management systems a, b and c are all operational. Under these conditions, IP address 1 will be allocated to system a, IP address 2 will be allocated to system b and IP address system c will be allocated to system c.

Line 702 identifies the condition where system c is no longer operational. The result is determined by line 603 of FIG. 6 which states that traffic management system a will be adopted for IP address 5 should a failure occur on system c. Thus, as illustrated at line 702, system a is now responsible for IP addresses 1 and 5, with b still retaining responsibility for IP address 2 and no IP addresses being allocated to system c.

Similarly as shown at line 703, system b has failed, resulting in IP address 2 being assigned to traffic management system c.

Again, when system a fails, as illustrated at line 704, traffic management system b is now allocated IP address 1 and system c retains IP address 5, with system a not dealing with any IP addresses.

Lines 705, 706 and 707 identify the condition where traffic management systems a, b and c respectively are the only ones operational. As illustrated, under these conditions, the single operational traffic management system will be allocated all three.

Using the transition table to decide the responsibilities of the traffic management systems means that whenever a particular combination of functional and non-functional traffic management systems occurs, the responsibility of the functional traffic management systems for network addresses is identical. In particular, if traffic management systems become unavailable and then become available again, each system will be responsible for the same IP addresses after this occurs as before.

Figure 8:
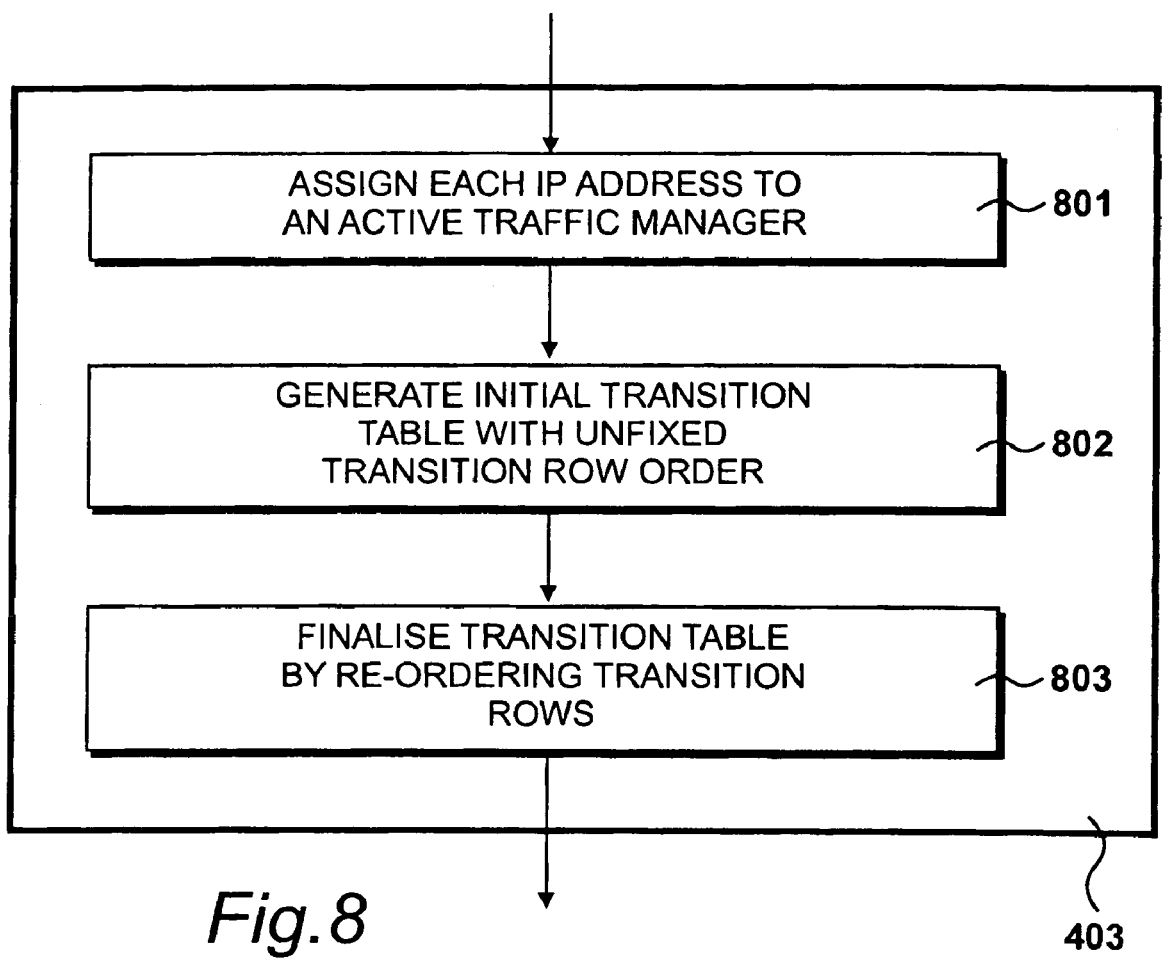
FIG. 8 details steps carried out in FIG. 6 for generating transition tables.

Procedures carried out at step 403 for generating transition tables are detailed in FIG. 8.

FIG. 8

At step 801 each IP address is assigned to an active traffic manager, and at step 802 an initial transition table with unfixed transition row order is generated. At step 803 this transition table is finalised by re-ordering the transition rows.

The re-ordering procedure attempts to evenly distribute traffic between the working machines in the cluster, effectively creating a good transition table as distinct from a bad one. For example, if as the result of a machine failure one machine is responsible for four addresses and another has only one, this is not a very even distribution. Therefore a good transition table may be defined as one where for each state the difference between the number of addresses on each working machine is preferably at most one.

Figure 9:
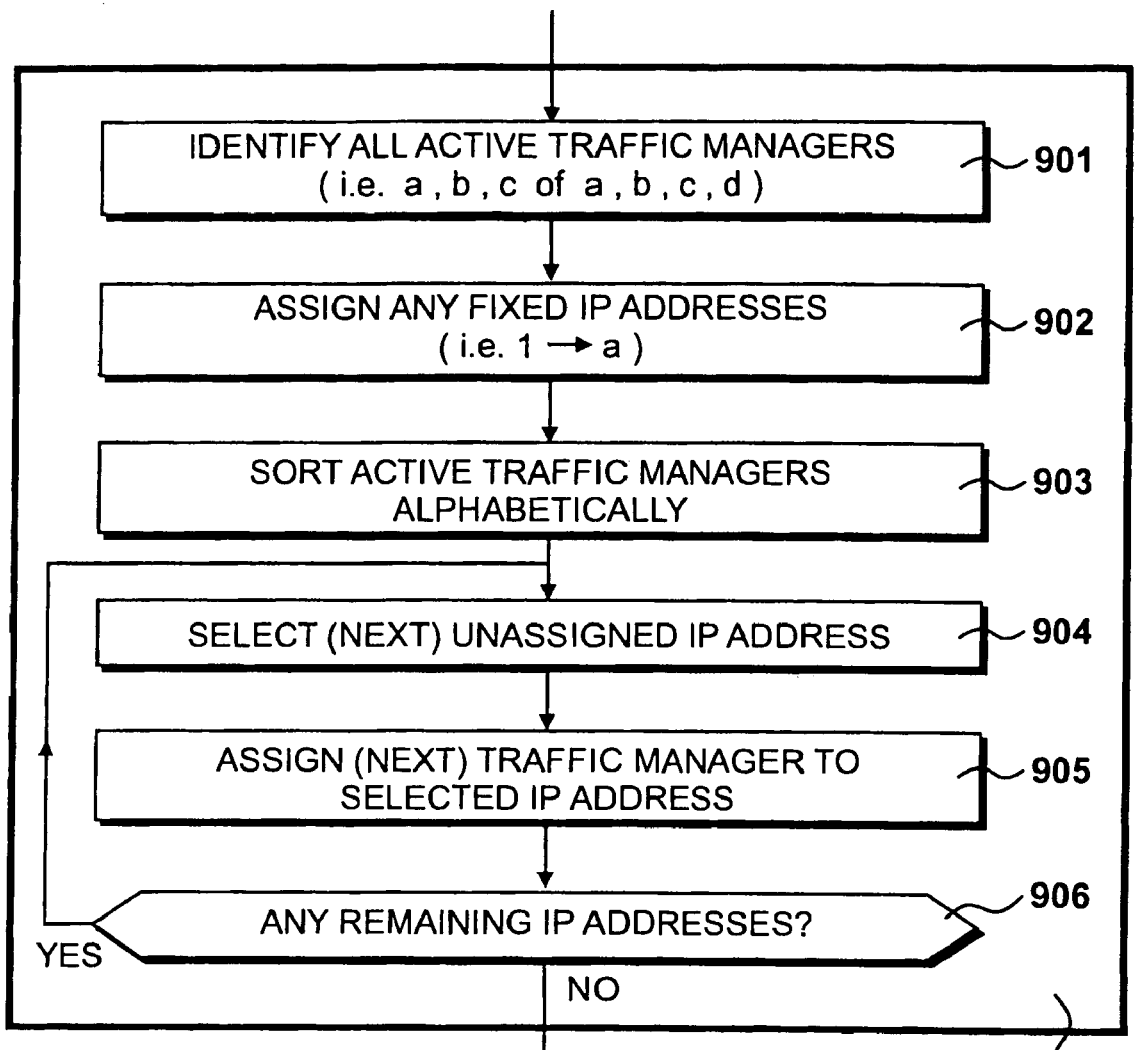
FIG. 9 details steps carried out in FIG. 10 for assigning IP addresses.

Procedure 801 for assigning IP addresses is detailed in FIG. 9.

FIG. 9

At step 901 all of the active traffic management systems are identified. This consists of systems a, b and c, but not d which is considered to be inactive. In this example, a, b and c may be assumed to correspond to systems 120, 121 and 122. These three are active and will be initially assigned IP addresses. System 123 in FIG. 1 may be considered as the d system and is presently on standby and remains on standby when all of the other systems are working.

At step 902 the fixed IP addresses are assigned. Usually one system, although it may be more, is given an initial IP address as a starting point for the procedure.

At step 903 the traffic management systems are sorted alphabetically by referring to their names which, in this example, gives the order a, b, c. At step 904 the next unassigned IP address is selected. Thus, the procedure starts off with IP address 2, then 5, then 6 on remaining iterations.

At step 905 the next traffic manager is assigned to the IP address selected at step 904. Thus, a was assigned at step 902 so the next available system is b. Consequently, IP address 2 is assigned to system b and, on the next iteration, IP address 5 is assigned to c. On the final iteration to allocate IP address 6, no traffic management systems remain, so the procedure returns to the start of the system alphabetical list. Consequently, IP address 6 is allocated to system a. Eventually, all of the IP addresses will have been considered, resulting in the question asked at step 906 being answered in the negative.

Figure 10:
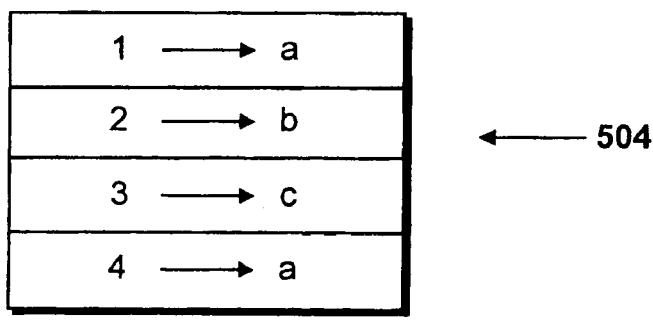
FIG. 10 illustrates the results produced from the operation of the procedure illustrated in FIG. 11.

An illustration of the results produced from the operation of the procedure illustrated in FIG. 9 is shown in FIG. 10.

FIG. 10

As illustrated in FIG. 10, IP address 1 has been allocated to system a, IP address 2 has been allocated to system b, IP address 5 has been allocated to system c and IP address 6 has been allocated to system a.

Figure 11:
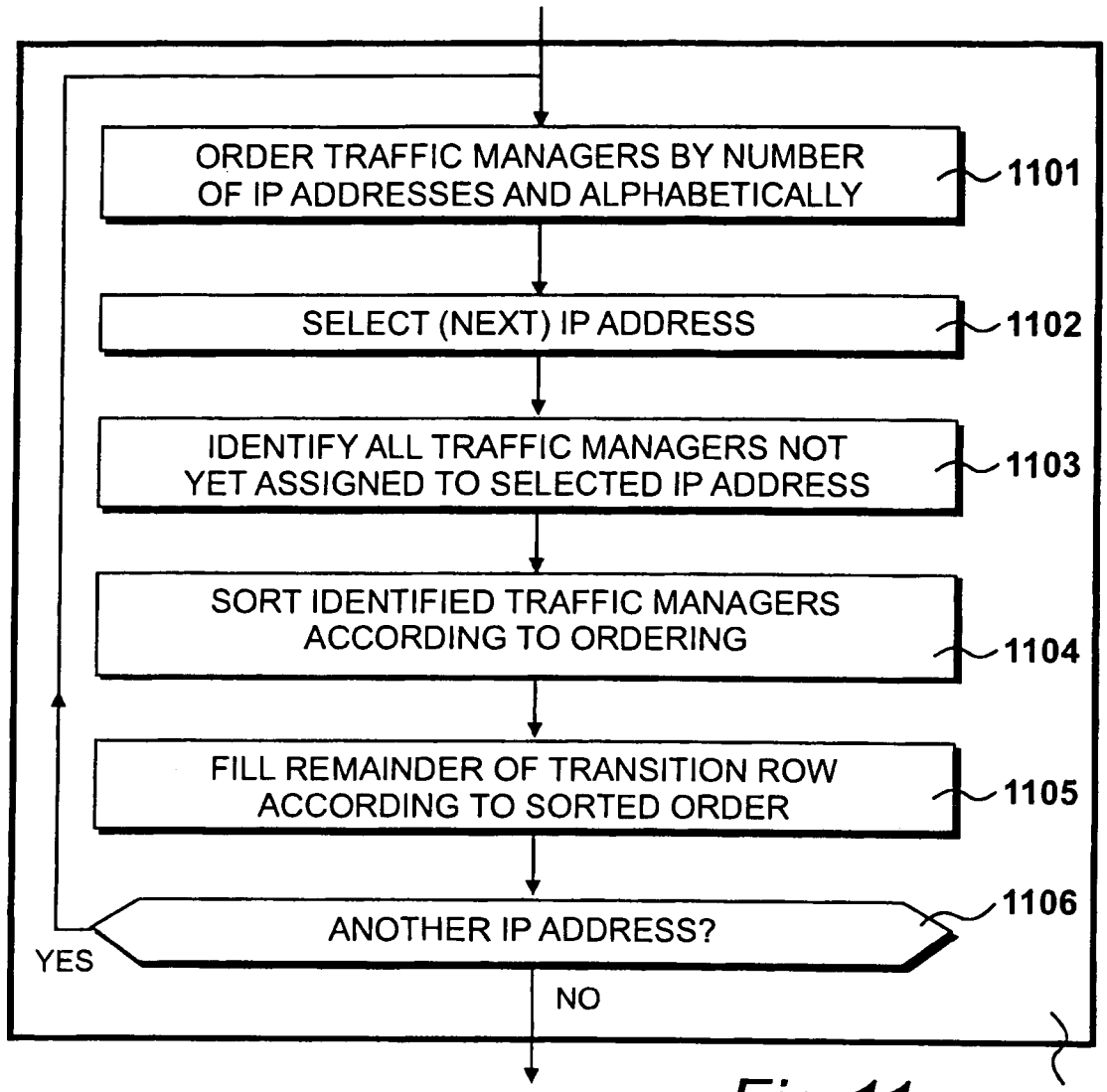
FIG. 11 details steps carried out in FIG. 10 to generate an initial transition table.

Details of the procedure identified at step 802 of FIG. 8 are shown in FIG. 11.

FIG. 11

For this procedure, all of the traffic management systems, both active and standby, are considered, in contrast to step 801 during which only the active systems were considered and placed into the transition table.

At step 1101 the IP addresses are sorted firstly by the number of times they were allocated to traffic managers during step 801, and secondly by alphabetical order. Thus in this example d has not been allocated at all, b and c have been allocated once, and a has been allocated twice, giving an ordering of d, b, c, a.

At step 1102 an IP address is selected and at step 1103 all traffic management systems not yet allocated to this IP address are identified. On the first iteration this step will identify systems b, c and d as systems not yet allocated to IP address 1.

At step 1104 the identified systems are sorted according to the ordering identified at step 1101. Thus, for the first IP address, the identified systems are ordered d, b, c. However, any systems that have the same score as the system already allocated to that row are sorted so that systems coming alphabetically after the allocated system come before systems coming alphabetically before the allocated system. Thus, for example, if there were five systems e, f, g, h and i, with e having been allocated twice, f, g and h once, and i not at all, the ordering identified at step 1101 would be i, f, g, h, e.

However, for the row where g was already allocated, the ordering for the rest of that row would be i, h, f, e.

At step 1105 the remainder of the transition table rows are filled according to the system ordering identified at step 1104. At step 1106, a question is asked as to whether another IP address is to be considered and when answered in the affirmative control is returned to step 1102 where the next IP address is selected and the procedures iterated again.

Figure 12:
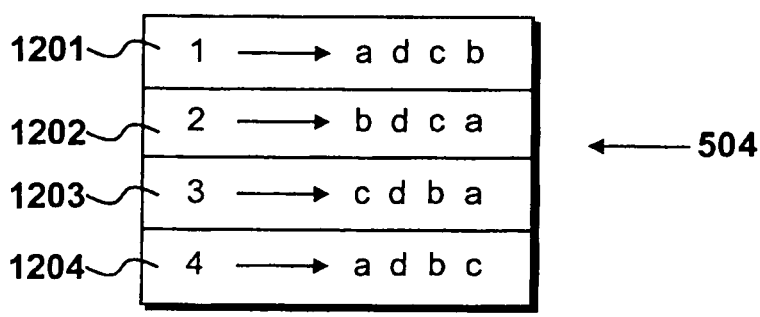
FIG. 12 shows exemplary results of the procedure performed in accordance with FIG. 11.

The results of the procedures performed in accordance with FIG. 11, for the specific worked example, are illustrated in FIG. 12.

FIG. 12

In the table, the first row 1201 shows an allocation, for IP address 1, of a, d, b, c. The order at row entry 1202 for IP address 2 is b, d, c, a. Similarly, the ordering at row 1203 for IP address 5 is c, d, b, a. Finally, an ordering of a, d, b, c is shown at row 1204 for IP address 6.

The first column contains fixed system names. However, columns 2 to 6 may need modification in order to improve even distribution following system failure.

Figure 13:
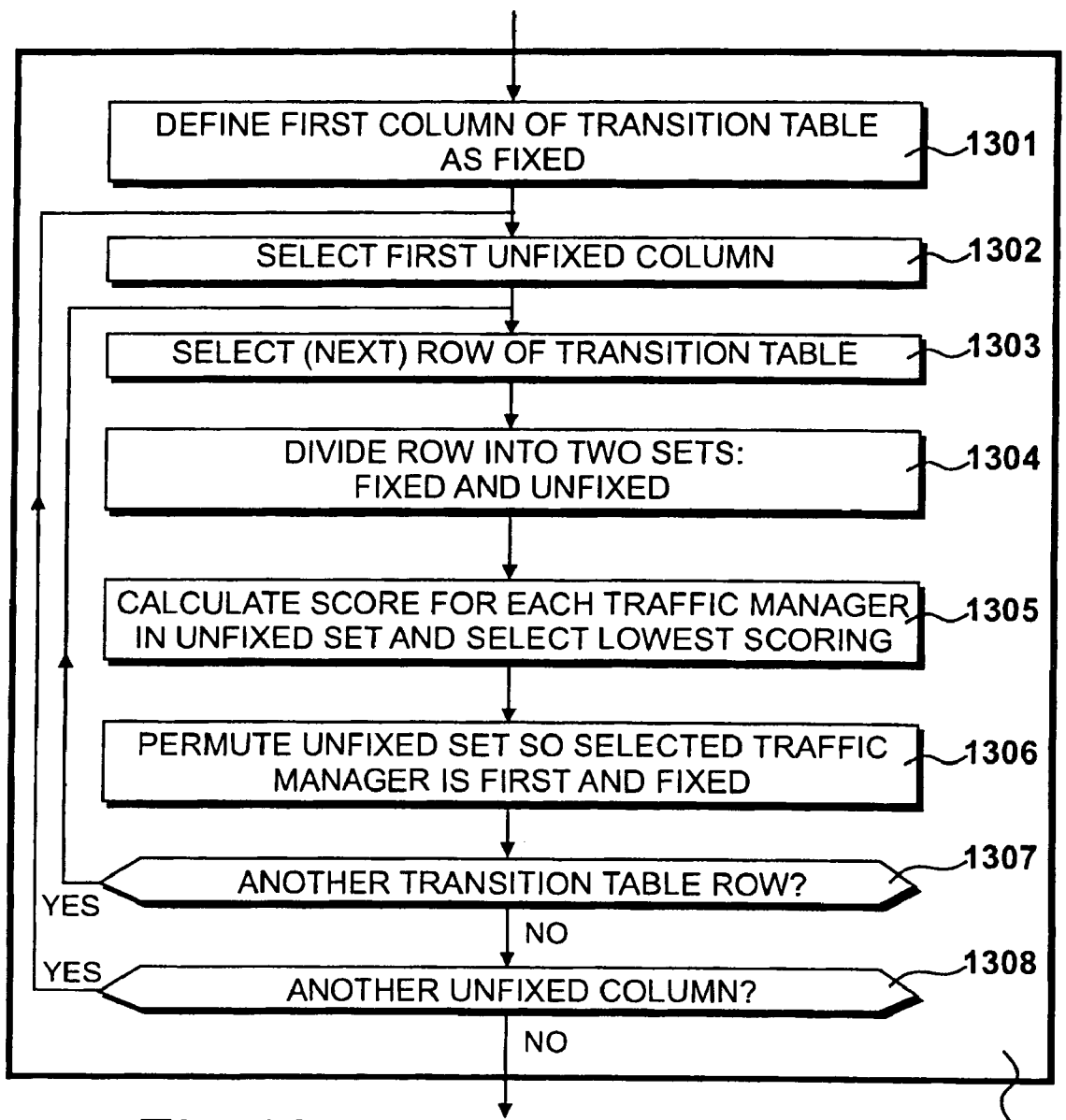
FIG. 13 details steps carried out in FIG. 10 to finalise the transition table.

Procedure 803 for finalising the transition table is detailed in FIG. 13.

FIG. 13

At step 1301 the first column of the transition table is defined as being fixed with the remaining three columns being considered as unfixed. Thus, in the top row of the table, allocation of system a for IP address 1 is fixed but the allocation of d, b and c are considered to be unfixed.

At step 1302 the first unfixed column, which on the first iteration is the second column, is selected, and at step 1303 the next row of the transition table, which on the first iteration is the first row, is selected. At step 1304 the contents of this row are divided into two sets: a fixed set containing fixed traffic managers, and an unfixed set containing unfixed traffic managers. Thus on the first iteration the fixed set is [a] and the unfixed set is [d b c].

At step 1305 a score is obtained for each traffic manager in the unfixed set and the traffic manager with the lowest score is selected. The scoring method is described in FIG. 14.

At step 1306 the unfixed set is permuted such that the selected traffic manager becomes the first in the set. Thus, for example, on the fourth iteration traffic manager b has the lowest score and thus the unfixed set [d b c] on the fourth line is permuted to be [b d c]. The selected traffic manager is then fixed.

At step 1307 a question is asked as to whether there is another transition table row, and if this question is answered in the affirmative then control is returned to step 1303 where the row is selected. If it is answered in the negative then all the traffic managers in the selected column have been fixed. At step 1308 a question is asked as to whether there is another unfixed column in the table, and if this question is answered in the affirmative control is returned to step 1302 where it is selected. Alternatively, the question is answered in the negative and step 803 is concluded.

Figure 14:
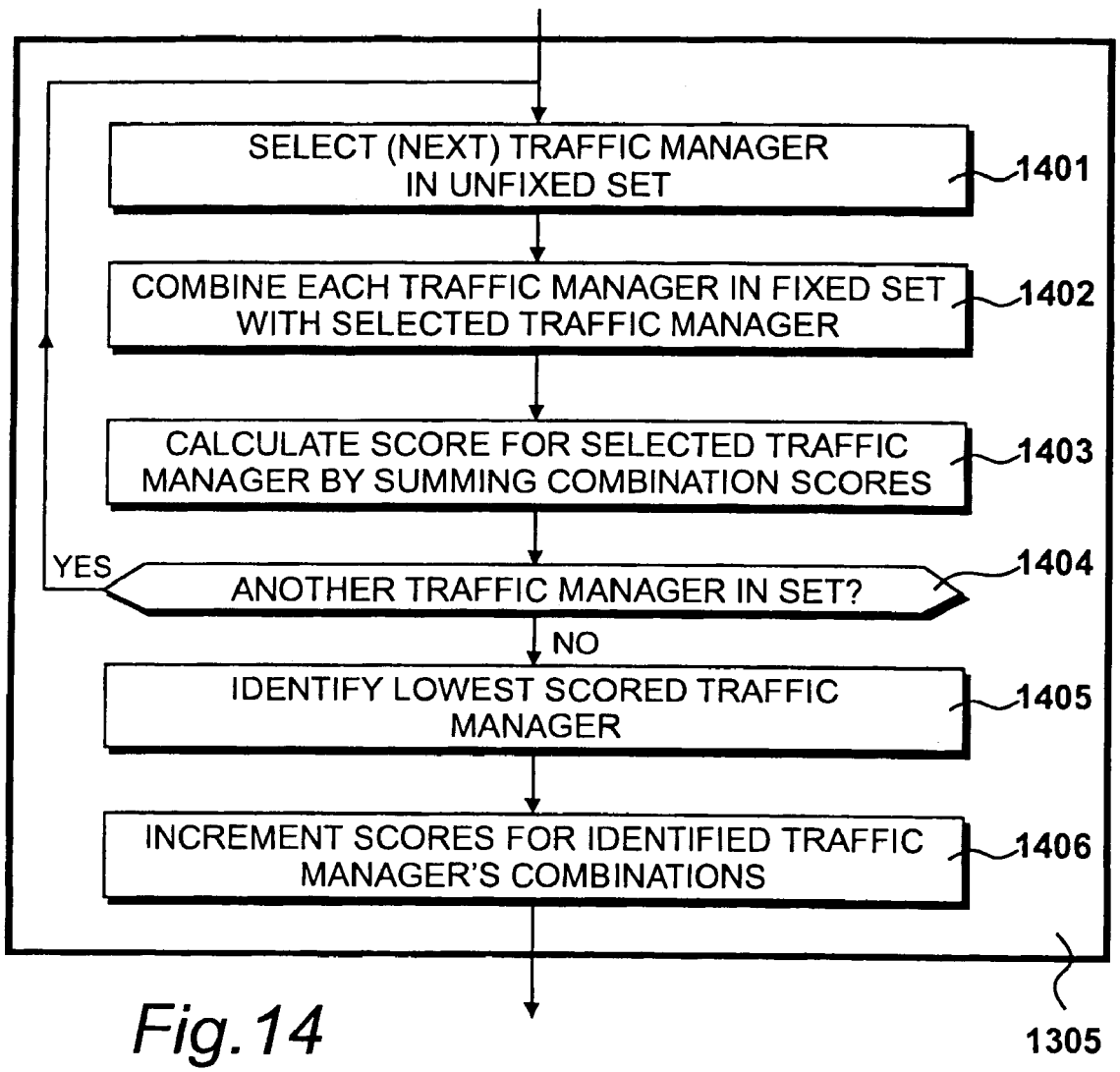
FIG. 14 details steps carried out in FIG. 13 to select a traffic manager.
Figure 15:
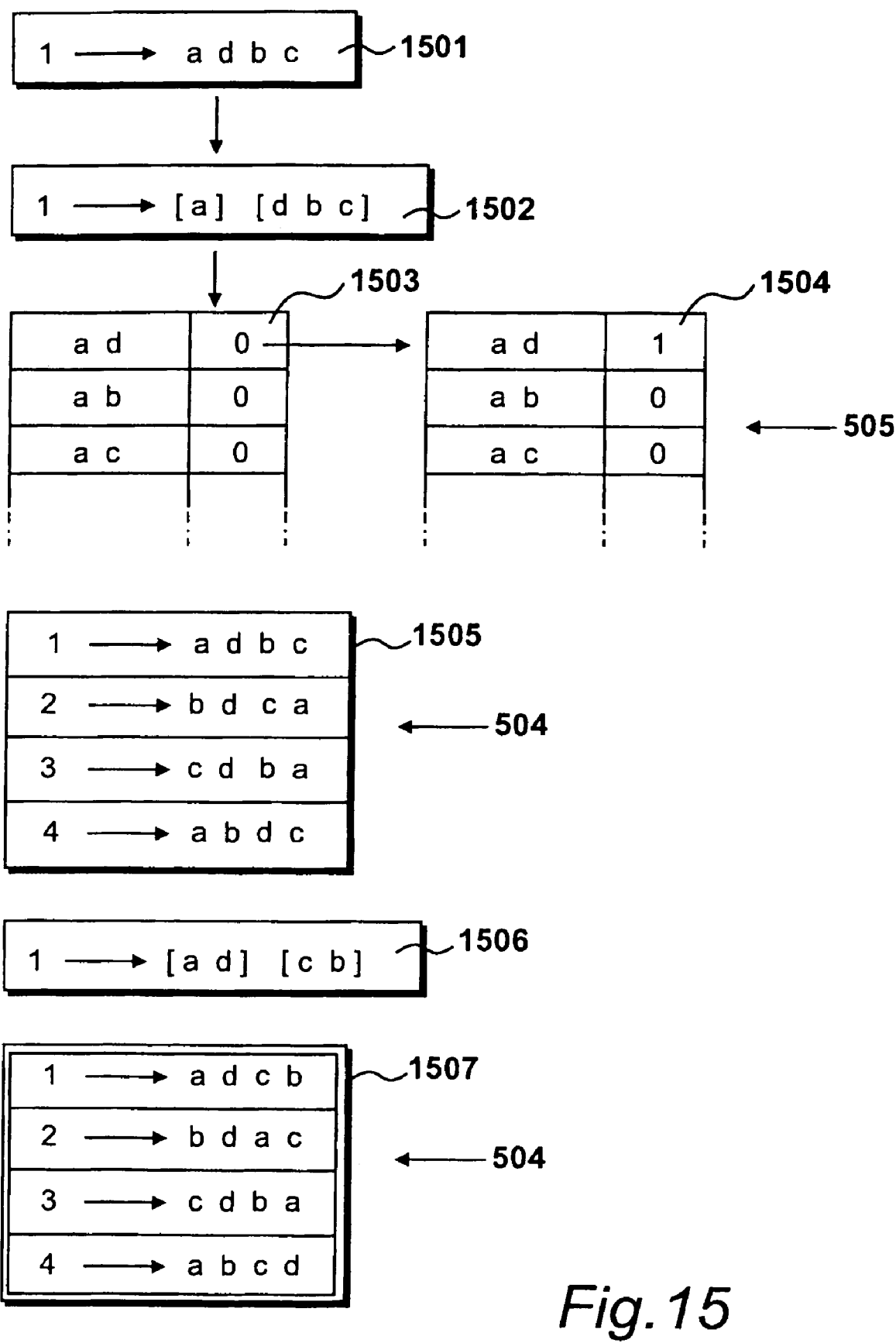
FIG. 15 illustrates the procedure of FIG. 13.

FIGS. 14 and 15

FIG. 14 details step 1305 where each unfixed traffic manager on a row is scored, and FIG. 15 shows the algorithm being used on the example transition table. On the first iteration the first row is selected, as shown at 1501. As shown at 1502, the fixed and unfixed sets are [a] and [d b c].

At step 1401 the first traffic manager in the unfixed set is selected, and at step 1402 each traffic manager in the fixed set is combined with this selected traffic manager. As shown at

1503, on the first iteration the selected traffic manager is d, giving the single pair [a d]. On later iterations where the fixed set contains more than one traffic manager there will be a combination of pairs. At step 1403 the score for each of these combinations is looked up in a table of scores and these scores are summed to give a score for the selected traffic manager. This table is obtained by counting, for a combination [x y], how many times y has occurred immediately after x in a fixed position. Clearly, on the first iteration, the scores for all combinations will be zero, since only the first column is fixed.

At step 1404 a question is asked as to whether there is another traffic manager in the unfixed set, and if this question is answered in the affirmative then control is returned to step 1401 where the next traffic manager is selected. Further iterations of steps 1401 to 1403 give the pairs [a b] and [a c], each of which on this first iteration have a score of zero, as shown at 1503.

When the question asked at step 1404 is answered in the negative, meaning that all the traffic managers in the unfixed set have been scored, then at step 1405 the first traffic manager with the lowest score is selected. In the present example, each of the pairs has a score of zero and so the first pair with the lowest score is [a d]. The second traffic manager in this pair, ie d, is identified as the lowest scoring traffic manager. The score of this pair is incremented by 1 in the scoring table at step 1406, as shown at 1504, because it now occurs in the fixed columns. It is necessary that it is the first lowest-scored traffic manager in the set that is selected, in order that each system constructs an identical transition table.

Continuing the example, and referring back to FIG. 12, the pairs available in the second row are [b d], [b c] and [b a]. Since all of these combinations score zero, d is again the selected traffic manager. The pairs available in the third row are [c d], [c b] and [c a]. Again, all of these pairs score zero and so d is the selected traffic manager. On the fourth row the pairs are [a d], [a b] and [a c]. However in this case [a d] has a score of one, since d has been fixed as the second value in the first row, meaning that the first lowest scoring combination is [a b], giving b as the selected traffic manager. Thus the first iteration of steps 1302 to 1308 gives a table with a fixed second column as shown at 1505. The pairs [a d], [b d], [c d] and [a b] now all have a score of one in the scoring table.

On the second iteration of steps 1302 to 1308 there are two traffic managers in the fixed set and two in the unfixed set, as shown at 1506. Thus the available combinations of pairs for the first row are [a b]+[d b], and [a c]+[d c]. The scores for the combinations are summed. Since [a b] occurs in row 6, [a c]+[d c] has the lower score of zero, and c is the selected traffic manager. Both of the pairs [a c] and [d c] are incremented by one in the scoring table. For the second row the combinations are [b c]+[d c], and [b a]+[d a]. The pair [d c] scores one, and so a is the selected traffic manager. For the third row the combinations are [c b]+[d b], and [c a]+[d a]. The pair [d a] scores one, meaning that b is the selected traffic manager. For the fourth row the combinations are [a d]+[b d], and [a c]+[b c]. The pairs [a d] and [b d] both score one, giving a combined score of two, meaning that c is the selected traffic manager.

The procedure continues in this way until the full transition table shown at 1507 is obtained.

FIG. 16

Figure 16:
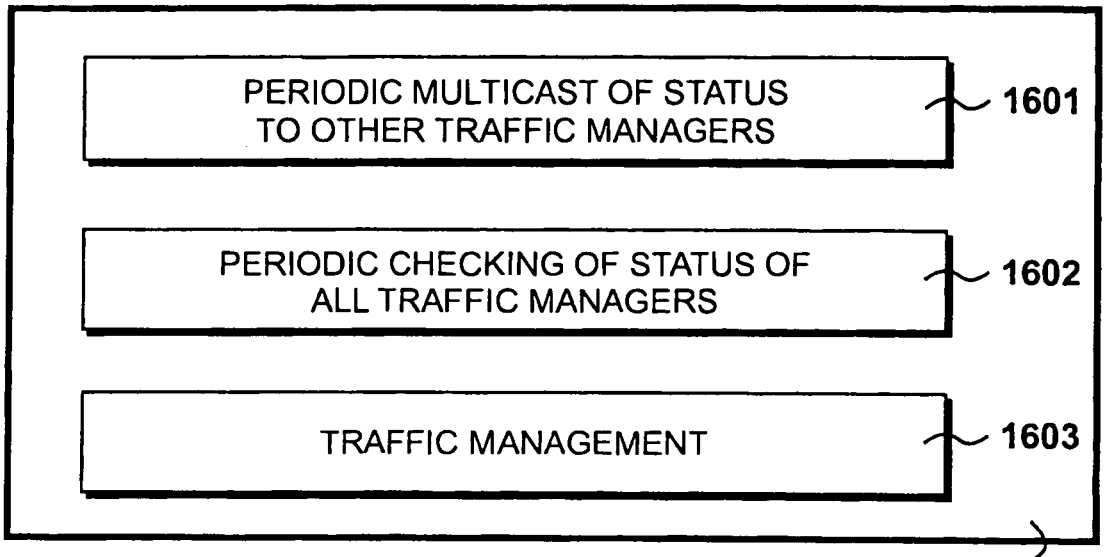
FIG. 16 details steps carried out in FIG. 5 for running a traffic management system.

Procedures 308 for running the traffic management systems are detailed in FIG. 16.

The procedures detailed in FIG. 16 identify what occurs on an individual traffic management system, such as system 120. The same operations are performed in parallel on all of the working traffic management systems, with the exception of the standby system or systems which do not carry out any actual traffic managing procedures.

Three separate threads of execution occur, shown as individual blocks 1601, 1602 and 1603.

Block 1601 represents periodic multicasting of status conditions to the other traffic management systems. This multicasting process transmits a system status. If a system develops a fault, it ceases transmitting the multicast. Such a procedure operates in a fail-safe way given that, if, for example the system develops a serious fault such as the failure of a power supply, it will be unable to transmit the multicast signal anyway.

Block 1602 represents periodic checking of traffic manager status. This process listens for multicast signals from other traffic managers, building up a list 506 of all traffic managers that have recently transmitted a multicast. IP address reconfiguration is performed if a traffic manager appears or disappears from this list.

Block 1603 represents traffic management operations performed by all active traffic managers, including routing client requests to the servers 108 to 119 according to client requirements.

FIG. 17

Figure 17:
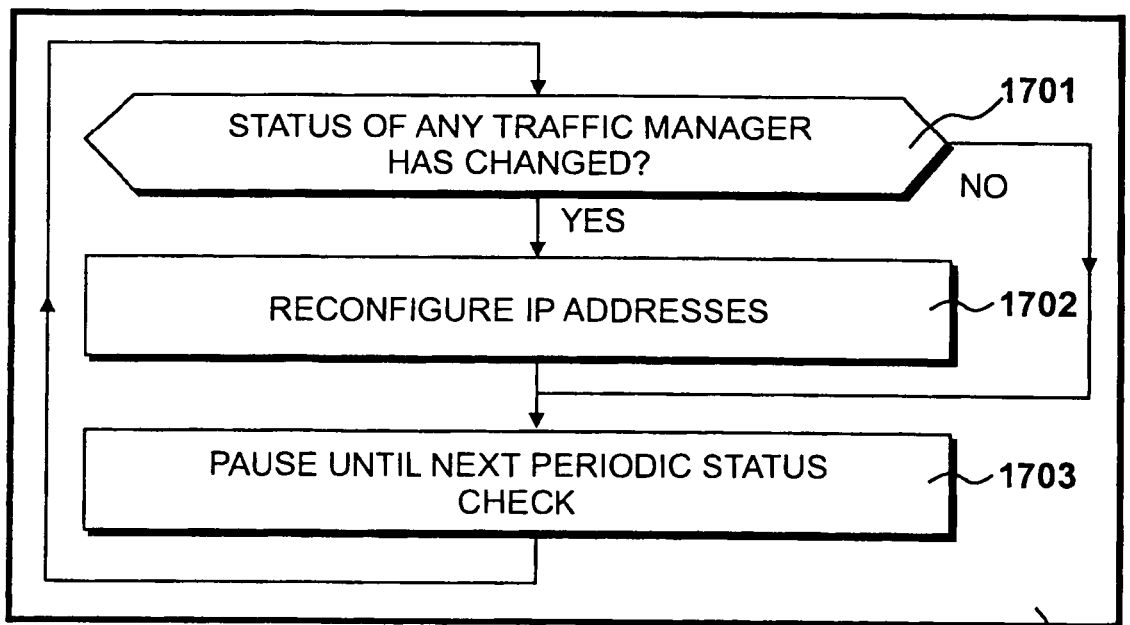
FIG. 17 details steps carried out in FIG. 16 for checking traffic manager status.

FIG. 17 details process 1602 for checking traffic manager status. At step 1701 a question is asked as to whether the status of any traffic manager has changed. This is performed by examining the list of traffic managers 506 which have recently transmitted a multicast. If this has changed then IP address reconfiguration may be required. This examination also includes the system doing the checking, so that if a system has recently come online it will receive its own multicast and reconfigure IP addresses accordingly.

If this question is answered in the affirmative then at step 1702 the transition table 504 is consulted and IP address assignments are reconfigured if necessary. At this point, or if the question is answered in the negative, the process pauses before returning to step 1701. During this pause, interrupts generated by reception of IP multicasts from other machines will be accumulated, automatically updating the list of traffic managers 506 that are available.

FIG. 18

Figure 18:
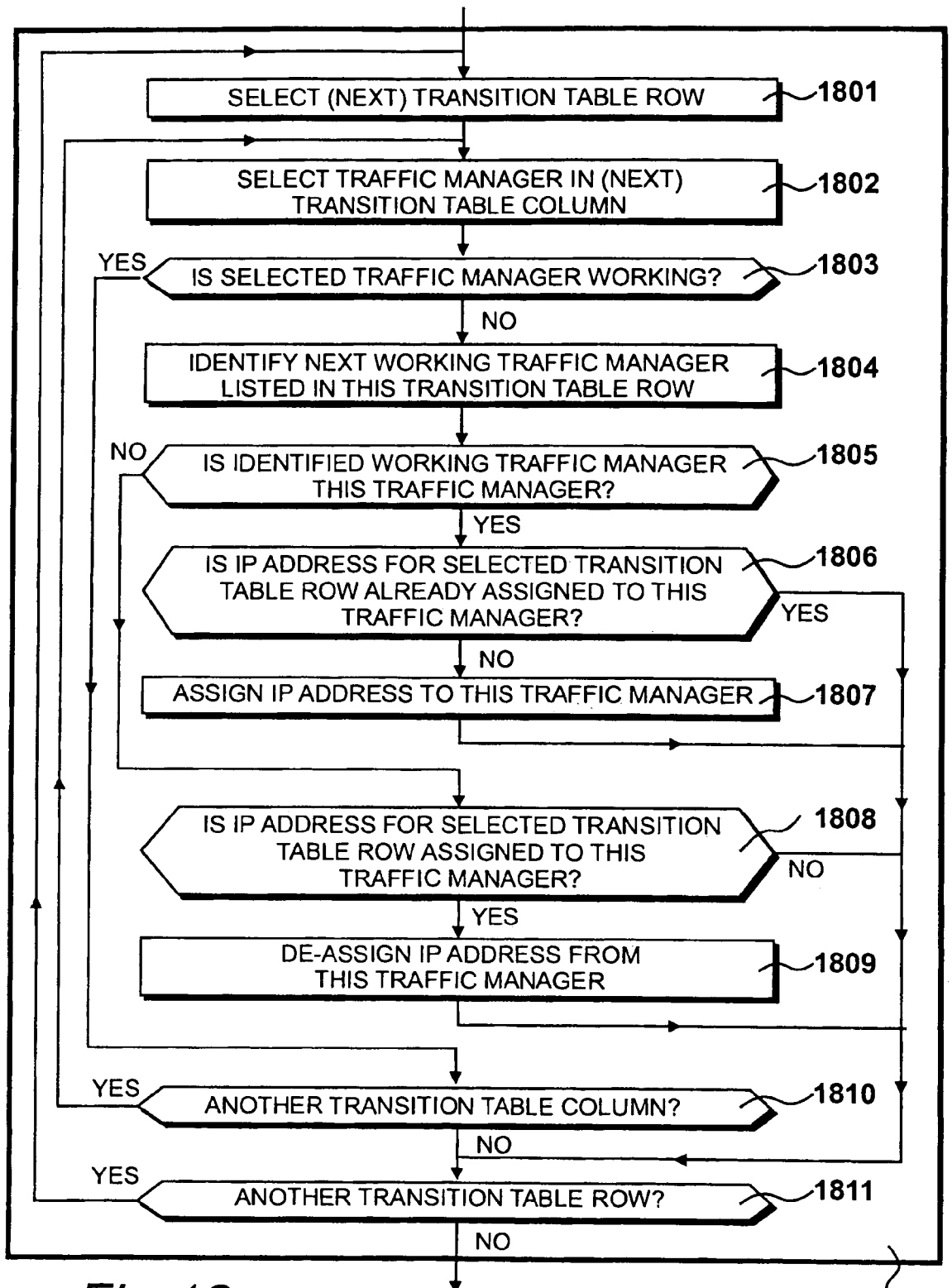
FIG. 18 details steps carried out in FIG. 17 to reconfigure IP address assignments.

FIG. 18 details step 1702 where IP addresses are reconfigured. The effect of step 1702 is to check whether the process needs to add or remove one or several IP address assignments. When a traffic manager fails, there is the possibility that the traffic manager on which this process is running needs to take over one or more IP addresses. Alternatively, when a traffic manager comes online, the traffic manager on which this process is running may need to release an IP address.

At step 1801 the first row in transition table 504 is selected and at step 1802 the traffic manager in the first column is selected. At step 1803 a question is asked as to whether this traffic manager is functional, and if this questions is answered in the negative then at step 1804 the next functional traffic manager in the row is identified. At step 1805 a question is asked as to whether the identified traffic manager is the traffic manager on which the process is running, and if this question is answered in the affirmative then at step 1806 a further question is asked as to whether the IP address for the selected row is already assigned to the traffic manager. If this question is answered in the negative then the IP address is assigned. Control is then directed to step 1811.

If the question asked at step 1805 is answered in the negative, to the effect that the identified traffic manager is not the traffic manager on which the process is running, then at step 1808 a question is asked as to whether the IP address for the selected row is assigned to the traffic manager on which the process is running. If this question is answered in the affirmative then at step 1809 the IP address is released. Control is then directed to step 1811.

If the question asked at step 1803 is answered in the affirmative, to the effect that the selected traffic manager is functioning, then at step 1810 a question is asked as to whether there is another column in the transition table, and if this question is answered in the affirmative then control is returned to step 1802 and the traffic manager in the next column of the row is selected.

If the question is answered in the negative, or if the question asked at step 1806 is answered in the affirmative, a question is asked as to whether there is another row in the transition table. If this question is answered in the affirmative then control is returned to step 1801 and the next row is selected. Alternatively, step 1702 is completed.

FIG. 19

FIG. 19 illustrates the effect of using a transition table. As shown in FIG. 1, the service provider 107 includes traffic managers 120 to 123 that route traffic between servers 108 to 119. Table 504 on system 120 is shown with real IP addresses and traffic manager domain names. Tables 1901 on system 121, 1902 on system 122 and 1903 on system 123 are identical because they were constructed using the same algorithm.

As previously discussed, in this example the transition table is constructed with traffic manager 123, which has the domain name d.tm.amz.com, configured as a standby machine. Other configurations are possible. For example, all four traffic managers could be active. A larger number of traffic managers could be used, with all active or with some on standby. When new traffic managing machines are added or when one is removed a new transition table must be constructed.

The invention claimed is:

1. A method of tolerating a failure in an environment in which a plurality of traffic management systems are co-ordinated to manage the supply of web site data from a plurality of servers to a significantly large number of browsing clients via a plurality of network addresses, wherein each of said functional traffic management systems is responsible for at least one network address;

each of said functional traffic management systems periodically transmits a signal to each of the other traffic management systems to confirm that it is functioning functionality;

each of said traffic management systems individually creates and maintains configuration data that specifies the responsibility of traffic management systems for network addresses dependent upon the status of each of the traffic management systems, such that each traffic management system has local information telling it which of the available servers to use for any combination of available traffic management systems; and each of said traffic management systems responds to a failure of any of the other of said traffic management systems by each taking responsibility for a certain proportion of the network addresses as prescribed by said configuration data, such that functioning traffic management systems take over the responsibility of the network addresses that were the responsibility of the now non-functional traffic management system without receiving additional instructions from a master control;

wherein said step of producing an ordered list for an IP address comprises the steps of:

identifying a score for each of said traffic management systems by counting the number of IP addresses it has been allocated to as primary system; producing a list of traffic management systems wherein the list is sorted by:

(a) said scores, lowest first, and (b) the names of said traffic management systems, in alphabetical order; and placing said primary system at the front of the list;

wherein said list is additionally sorted such that traffic management systems having the same score as the primary system and with a name coming alphabetically after the name of said primary system are earlier in the list than traffic management systems with the same score as the primary system and with a name coming alphabetically before the name of said primary system.

2. A method according to claim 1, wherein additional traffic management systems are considered to be inactive, and an inactive traffic management system only takes responsibility for network addresses when an active traffic management system becomes non-functional.

3. A method according to claim 1, wherein said configuration data contains a list of IP addresses and a prioritised list of traffic management systems for each IP address.

4. A method of producing configuration data for use in the method of claim 1, comprising the steps of:

identifying traffic management systems;

identifying IP addresses of servers;

producing, for each of said IP addresses, a prioritised list of all traffic management systems, wherein for any ordered pair of traffic management systems the number of times said pair appears in said lists is substantially the same.

5. A method according to claim 4, wherein each of said traffic management systems has a status of active or inactive, and wherein the first traffic management system in each list is an active traffic management system.

6. A method according to claim 4, wherein the step of producing prioritised lists comprises the steps of:

allocating a traffic management system to each IP address as a primary system, wherein for any two traffic management systems the number of IP addresses to which they are allocated differs by no more than one; and for each IP address, producing an ordered list of all the traffic management systems with said primary system being first, and reordering said list to produce a prioritised list.

7. A method according to claim 6, wherein the step of reordering said lists comprises the steps of:

defining the primary system in each list as fixed;

(a) for each list in turn:

producing a list of combinations of pairs of fixed systems and unfixed systems, scoring each pair according to the number of times it appears in fixed parts of the lists, selecting the lowest-scoring combination of pairs, selecting the unfixed system that appears in the selected combination;

permuting the unfixed systems in the list such that the selected system appears first, and defining the selected system as fixed;

(b) cycling through the lists by repeating step (a), until all the systems are defined as fixed.

8. A computer storage system for managing the supply of web site data from a plurality of servers to a plurality of browsing clients via a plurality of network addresses, including a processor, storage and at least one network connection, wherein said processor is configured to:

take responsibility for at least one network address; periodically transmit a signal to similar computer systems over a network to confirm functionality;

create and maintain configuration data that specifies the responsibility of each computer system for network addresses dependent upon the status of each of the computer systems, such that the traffic management system has local information telling it which of the available servers to use for any combination of similar systems in a network; and respond to a failure of any of said similar computer systems by taking responsibility for certain network addresses as prescribed by said configuration data such that the computer system does not need to receive this configuration data from another system and it is not responsible for transmitting this configuration data to another system;

wherein the processor is configured to produce an ordered list for an IP address by performing the steps of;

identifying a score for each of said computer systems by counting the number of IP addresses it has been allocated to as primary system;

producing a list of computer systems wherein the computer systems are sorted by;

(a) said scores, lowest first, and (b) the names of said computer systems, in alphabetical order; and placing said primary system at the front of the list;

wherein said list is additionally sorted such that computer systems having the same score as the primary system and with a name coming alphabetically after the name of said primary system are earlier in the list than computer systems with the same score as the primary system and with a name coming alphabetically before the name of said primary system.

9. A computer system according to claim 8, wherein whenever a particular combination of functional and non-functional computer systems occurs, the responsibility of the functional computer systems for network addresses is identical.

10. A computer system according to claim 8, wherein said computer system is further networked to a computer system that is considered to have a status of inactive which only takes responsibility for network addresses when an active computer system becomes non-functional.

11. A computer system according to claim 8, wherein said configuration data contains a list of IP addresses and a prioritised list of computer systems for each IP address.

12. A computer system according to claim 8, wherein said processor is configured to create configuration data by performing the steps of:

identifying all of said computer systems on the network;

identifying the IP addresses of said servers;

producing, for each of said IP addresses, a prioritised list of all computer systems, wherein for any ordered pair of computer systems the number of times said pair appears in said lists is substantially the same.

13. A computer system according to claim 12, wherein each of said computer systems has a status of active or inactive, and wherein the first computer system in each list is an active computer system.

14. A computer system according to claim 12, wherein the processor is configured to produce prioritised lists by performing the steps of:

allocating a computer system to each IP address as a primary system, wherein for any two computer systems the number of IP addresses to which they are allocated differs by no more than one; and for each IP address, producing an ordered list of all the computer systems with said primary system being first, and reordering said list to produce a prioritised list.

15. A computer system according to claim 14, wherein the processor is configured to reorder said lists by performing the steps of:

defining the primary system in each list as fixed;

(a) for each list in turn:

producing a list of combinations of pairs of fixed computer systems and unfixed computer systems, scoring each pair according to the number of times it appears in fixed parts of the lists, selecting the lowest-scoring combination of pairs, selecting the unfixed computer system that appears in the selected combination;

permuting the unfixed computer systems in the list such that the selected computer system appears first, and defining the selected computer system as fixed;

(b) cycling through the lists by repeating step (a), until all the computer systems are defined as fixed.

16. A computer-readable storage medium having computer-readable instructions contained thereon, such that when executed by a computer said instructions configure said computer to manage the supply of web site data from a plurality of servers to a plurality of clients by performing the following steps:

taking responsibility for at least one network address;

periodically transmitting a signal to similar computers over a network to confirm functionality;

individually creating and maintaining configuration data that specifies the responsibility of each computer for network addresses dependent upon the status of each of the computers, such that each computer system has local information telling it which of the available servers to use for any combination of available traffic management systems; and responding to a failure of any of said computers by taking responsibility for a certain proportion of the network addresses as prescribed by said configuration data such that functioning computers take over the responsibility of the network addresses that were the responsibility of the now non-functional computer without receiving additional instructions from a master computer;

wherein said instructions configure said computer to produce an ordered list for an IP address by performing the steps of;

identifying a score for each of said computers by counting the number of IP addresses it has been allocated to as primary computer;

producing a list of computers wherein the computers are sorted by:

(a) said scores, lowest first, and (b) the names of said computers, in alphabetical order; and placing said primary computer at the front of the list;

wherein said list is additionally sorted such that computers having the same score as the primary computer and with a name coming alphabetically after the name of said primary computer are earlier in the list than computers with the same score as the primary computer and with a name coming alphabetically before the name of said primary computer.

17. A computer system according to claim 16, wherein said computer system is further networked to a computer that is considered to have a status of inactive which only takes responsibility for network addresses when an active computer system becomes non-functional.

18. A computer-readable medium according to claim 16, wherein said configuration data contains a list of IP addresses and a prioritised list of computers for each IP address.

19. A computer-readable medium according to claim 16, wherein said instructions configure said computer to create configuration data by performing the steps of:
identifying all of said computers on the network;
identifying the IP addresses of said servers;
producing, for each of said IP addresses, a prioritised list of all computers, wherein for any ordered pair of computers the number of times said pair appears in said lists is substantially the same.

20. A computer-readable medium according to claim 19, wherein said instructions configure said computer to produce prioritised lists by performing the steps of:
allocating a computer to each IP address as a primary computer, wherein for any two computers the number of IP addresses to which they are allocated differs by no more than one; and
for each IP address, producing an ordered list of all the computers with said primary computer being first, and reordering said list to produce a prioritised list.

21. A computer-readable medium according to claim 20, wherein said instructions configure said computer to reorder said lists by performing the steps of:
defining the primary computer in each list as fixed;
(a) for each list in turn:
producing a list of combinations of pairs of fixed computers and unfixed computers,
scoring each pair according to the number of times it appears in fixed parts of the lists,
selecting the lowest-scoring combination of pairs,
selecting the unfixed computer that appears in the selected combination;
permuting the unfixed computers in the list such that the selected computer appears first, and
defining the selected computer to be fixed;
(b) cycling through the lists by repeating step (a), until all the computers are defined as fixed.

22. A computer-readable medium according to claim 19, wherein each of said computers has a status of active or inactive, and wherein the first computer in each list is an active computer.

* * * * *